Figure 1:
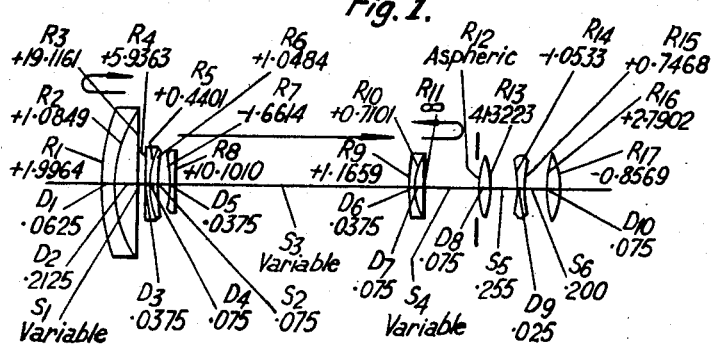

Inventor
G. H. Cook
By
Attorneys

3,191,496
OPTICAL OBJECTIVES OF VARIABLE FOCAL LENGTH OF THE ZOOM TYPE AND CONTROL MEANS THEREFOR
Gordon Henry Cook, Leicester, England, assignor to The Rank Organisation Limited, London, England, a company of Great Britain
Filed Sept. 1, 1960, Ser. No. 53,413
Claims priority, application Great Britain, Sept. 3, 1959, 30,034, 30,046
22 Claims. (Cl. 88—57)

This invention relates to an optical objective of the "zoom" type for photographic or other purposes, that is to an objective of the type having members relatively movable under the control of a zoom control element for varying the equivalent focal length of the objective whilst maintaining constant position of the final image plane of the objective, whereby continuous change in the size of the final image can be brought about by operation of the zoom control element.

It should be made clear that the terms "front" and "rear" are herein used, in accordance with the usual convention, to relate to the sides of the objective respectively nearer to and further from the longer conjugate.

It should also be made clear that the term "internal contact," when used herein in connection with a compound component, is to be understood as including, not only a cemented internal contact surface, but also what is often known as a "broken contact," that is an arrangement in which the two contacting surfaces have slightly different radii of curvature. In such case, the effective radius of curvature of the broken contact is the arithmetic mean between the radii of curvature of the two constituent surfaces, and the effective power thereof is the harmonic mean between the powers of the two surfaces.

Various arrangements of the relatively movable members are known in zoom type objectives, and in many of them the relatively movable members include a movable divergent member, which is located behind at least one other member and in front of the diaphragm of the objective and receives a converging beam from the member in front of it. It is customary to provide such divergent member with a strongly collective internal contact, in order to facilitate correction of spherical aberration in the objective. Difficulty is experienced, however, in achieving good correction for some of the other aberrations, more especially astigmatism, in such objectives.

One of the objects of the present invention is to provide an objective of the zoom type, wherein the relatively movable members, and especially the said movable divergent member, are arranged in an improved manner to facilitate adequate correction, not only for spherical aberration, but also for astigmatism and the other primary aberrations.

Various practical difficulties also arise in objectives of the zoom type in controlling the relative movements of the members of the objective, and further objects of the invention are concerned with an improved arrangement of the relatively movable members of the objective whereby such difficulties can be overcome.

Thus, for instance, one difficulty is that provision has usually to be made for a focussing control to suit different object distances. This entails superimposing an additional movement for focussing purposes on at least one of the members of the objective, for example the front member, without disturbing the relative movements for zooming purposes.

Another difficulty is that the change in image size due to a small change in equivalent focal length at one end of the range of variation is very different from that due to a similar small change in focal length at the other end of the range of variation, so that if the rate of change of focal length bears a linear relationship to the movement of the zoom control element, a steady movement of such element would produce a slow rate of change of image size at one end of the range varying to a rapid change of image size at the other end of the range. This gives a very disturbing visual effect, and it is therefore desirable to arrange for the focal length to vary in accordance with an approximately logarithmic law with respect to the movement of the zoom control element.

This in turn considerably complicates the zooming control mechanism, since it necessarily entails non-linear movements of some at least of the individual members of the objective, and thus requires the use of specially shaped cams or equivalent devices in the mechanism. Owing to the big difference between the relative movements at the two ends of the range, it is difficult in practice to avoid having to use a cam which is very steep at one end of the range demanding excessive torque in the drive, and in addition there are severe mechanical and other disadvantages in the use of two or more differently shaped cams for the individual movable members.

These difficulties have to some extent been met by the invention forming the subject of the copending United States Patent 3,004,471, filed October 20, 1958, which is concerned with a control device for a variable focal length objective of the type forming the subject of the copending United States Patent 3,045,546, filed September 30, 1958, wherein the objective has a normally stationary rear assembly, and a front assembly including the relatively movable members and comprising an axially movable divergent member located behind an axially movable convergent member, the movements of such two members being so inter-related that the virtual image formed by the divergent combination of such two members constituting the front assembly has a constant axial position relatively to the stationary rear assembly throughout the range of variations of the equivalent focal length of the objective. In such objective, it is convenient, when the zoom control element is operated to increase the equivalent focal length of the objective, for the divergent member of the front assembly to move backwards towards the stationary rear assembly, while the convergent front member of the front assembly at first moves forward and then back again to its initial position at the end of the movement.

In the control device for such objective forming the subject of the above-mentioned Patent 3,004,471, two superimposed axial movements are imparted to one of the two relatively movable members of the front assembly, one of which varies in linear relationship to the movement of the zoom control element whilst the other is derived from such zoom control element through a cam, and an axial movement derived from the control element through such cam is imparted to the other relatively movable member, a transmission mechanism having an approximately 2:1 ratio being interposed in the drive from the cam to one of the two members. It is found that the use of this 2:1 ratio transmission mechanism makes it possible to obtain a close approximation to the desired logarithmic relationship between the rate of variation of the equivalent focal length and the movement of the zoom control element, whilst maintaining the image plane stationary throughout the range of variation.

A more detailed object of the present invention is to provide an improved arrangement of the relatively movable members of the front assembly, which will avoid the necessity for a plurality of non-linear movements and will also materially reduce the steepness of the controlling cam, whilst still maintaining the approximately logarithmic relationship between the rate of change of equivalent focal length and the movement of the zoom control element.

A further more detailed object of the invention, which is of especial importance in the larger sizes employing relatively heavy movable parts, is to reduce to a minimum the unbalanced mechanical load of the movable members.

Still further objects of the invention will be apparent from the appended claims and from the following description of the accompanying drawings, illustrating some convenient practical examples of zoom type of objective according to the invention. In these drawings, FIGURES 1–3 respectively illustrate diagrammatically three examples of objective according to the invention, and FIGURE 4 is a diagrammatic representation of one construction of mechanism for actuating the objective.

Figure 2:
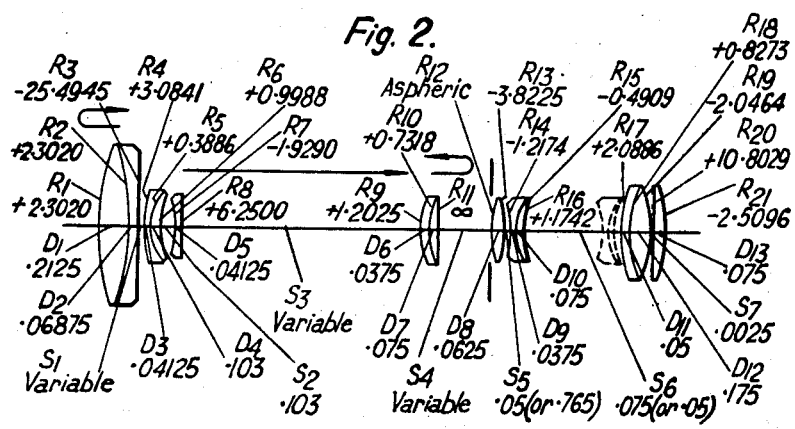
Figure 3:
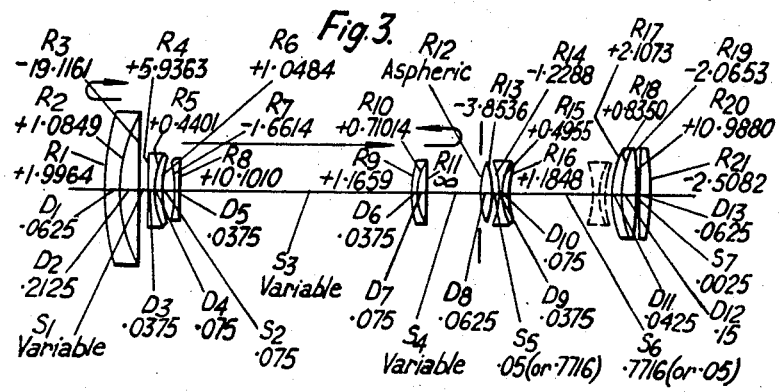
Figure 4:
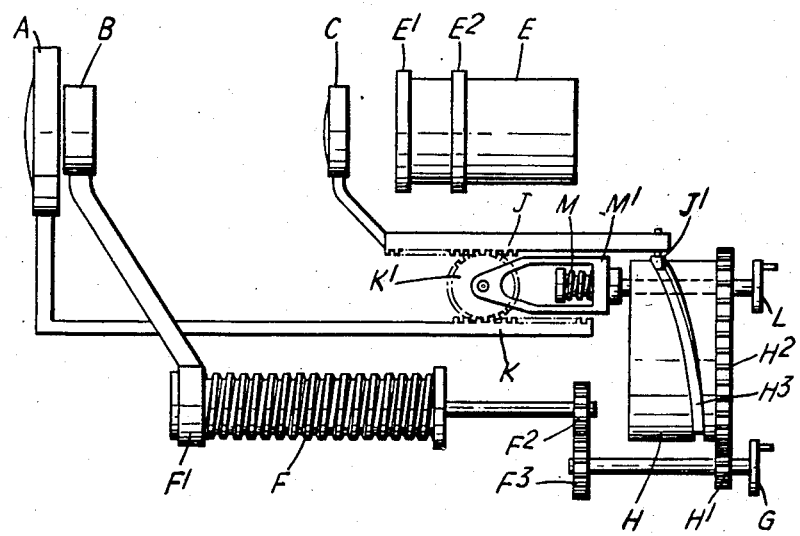

Numerical data for the examples of FIGURES 1–3 are given respectively in the following tables, in which $R_1R_2 \ldots$ represent the radii of curvature of the individual surfaces of the objective, the positive sign indicating that the surface is convex to the front and the negative sign that the surface is concave to the front, $D_1D_2 \ldots$ represent the axial thicknesses of the individual elements, and $S_1S_2 \ldots$ represent the axial air separations between the various components. The tables also give the mean refractive index $n_d$ for the $d$-line of the spectrum and the Abbé V number of each of the materials used in the objective, and in addition the effective clear diameters of the air-exposed surfaces of the objective.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

*Example I*

| Radius | Thickness or Air Separation | Refractive Index $n_d$ | Abbé V Number | Clear Diameter |
|---|---|---|---|---|
| $R_1 = +1.9964$ | | | | 1.25 |
| | $D_1 = .0625$ | 1.7618 | 26.98 | |
| $R_2 = +1.0849$ | | | | |
| | $D_2 = .2125$ | 1.6177 | 49.78 | |
| $R_3 = -19.1161$ | | | | 1.205 |
| | $S_1$ = variable | | | |
| $R_4 = +5.9363$ | | | | .578 |
| | $D_3 = .0375$ | 1.691 | 54.80 | |
| $R_5 = +0.4401$ | | | | |
| | $D_4 = .075$ | 1.7174 | 29.51 | .522 |
| $R_6 = +1.0484$ | | | | |
| | $S_2 = .075$ | | | .514 |
| $R_7 = -1.6614$ | | | | |
| | $D_5 = .0375$ | 1.691 | 54.80 | .518 |
| $R_8 = +10.1010$ | | | | |
| | $S_3$ = variable | | | .528 |
| $R_9 = +1.1659$ | | | | |
| | $D_6 = .0375$ | 1.7618 | 26.98 | |
| $R_{10} = +0.7101$ | | | | |
| | $D_7 = .075$ | 1.5097 | 64.44 | .522 |
| $R_{11} = \infty$ | | | | |
| | $S_4$ = variable | | | .522 |
| $R_{12}$ = aspheric | | | | |
| | $D_8 = .075$ | 1.61029 | 57.25 | .514 |
| $R_{13} = -41.3223$ | | | | |
| | $S_5 = .255$ | | | .412 |
| $R_{14} = -1.0533$ | | | | |
| | $D_9 = .025$ | 1.60483 | 43.83 | .404 |
| $R_{15} = +0.7468$ | | | | |
| | $S_6 = .200$ | | | .435 |
| $R_{16} = +2.7902$ | | | | |
| | $D_{10} = .075$ | 1.60557 | 60.02 | .437 |
| $R_{17} = -0.8569$ | | | | |

The aspheric surface $R_{12}$ has radius of curvature $+0.7962F_0$ at the vertex and is defined by the equation:

$$x = (.7962 - \sqrt{.6339 - y^2}) - .02092y^4 + .2370y^6 + .0030y^8 + 8.5533y^{10}$$

where $y$ is the radial distance from the optical axis and $x$ is the axial distance from the transaxial plane through the vertex of the surface, measured rearwardly of such plane for positive values of $x$.

The dimensions of the variable air spaces are as follows:

| | $S_1$ | $S_3$ | $S_4$ |
|---|---|---|---|
| $F = F_0$ | .0375 | 1.8264 | .41675 |
| $F = \sqrt{F_0 F_m}$ | 1.2736 | 1.2736 | .075 |
| $F = F_m$ | 1.8264 | .0375 | .41675 |

*Example II*

| Radius | Thickness or Air Separation | Refractive Index $n_d$ | Abbé V Number | Clear Diameter |
|---|---|---|---|---|
| $R_1 = +2.3020$ | | | | 1.274 |
| | $D_1 = .2125$ | 1.65695 | 50.81 | |
| $R_2 = -2.3020$ | | | | |
| | $D_2 = .06875$ | 1.7618 | 26.98 | |
| $R_3 = -25.4945$ | | | | 1.221 |
| | $S_1$ = variable | | | |
| $R_4 = +3.0841$ | | | | .603 |
| | $D_3 = .04125$ | 1.691 | 54.80 | |
| $R_5 = +.3886$ | | | | |
| | $D_4 = .103$ | 1.674 | 32.00 | .534 |
| $R_6 = +.9988$ | | | | |
| | $S_2 = .103$ | | | .516 |
| $R_7 = -1.9290$ | | | | |
| | $D_5 = .04125$ | 1.691 | 54.80 | .511 |
| $R_8 = +6.2500$ | | | | |
| | $S_3$ = variable | | | .524 |
| $R_9 = +1.2025$ | | | | |
| | $D_6 = .0375$ | 1.7618 | 26.98 | |
| $R_{10} = +.7318$ | | | | |
| | $D_7 = .075$ | 1.5097 | 64.44 | .518 |
| $R_{11} = \infty$ | | | | |
| | $S_4$ = variable | | | .518 |
| $R_{12}$ = aspheric | | | | |
| | $D_8 = .0625$ | 1.48503 | 70.29 | .514 |
| $R_{13} = -3.8225$ | | | | |
| | $S_5 = .05$ or .765 | | | .508 |
| $R_{14} = -1.2174$ | | | | |
| | $D_9 = .0375$ | 1.65695 | 50.81 | |
| $R_{15} = +.4909$ | | | | |
| | $D_{10} = .075$ | 1.7618 | 26.98 | .513 |
| $R_{16} = +1.1742$ | | | | |
| | $S_6 = .765$ or .05 | | | .742 |
| $R_{17} = +2.0886$ | | | | |
| | $D_{11} = .05$ | 1.7618 | 26.98 | |
| $R_{18} = +.8273$ | | | | |
| | $D_{12} = .175$ | 1.61334 | 57.59 | .748 |
| $R_{19} = -2.0464$ | | | | |
| | $S_7 = .0025$ | | | .745 |
| $R_{20} = +10.8029$ | | | | |
| | $D_{13} = .075$ | 1.5097 | 64.44 | |
| $R_{21} = -2.5096$ | | | | .743 |

The aspheric surface $R_{12}$ has radius of curvature $+1.8262F_0$ at the vertex and is defined by the equation:

$$x = (1.8262 - \sqrt{3.3348 - y^2}) - .004135y^4 + .2330y^6 - .2541y^8 + 8.9889y^{10}$$

The dimensions of the variable air spaces in the front assembly are as follows:

| | $S_1$ | $S_3$ | $S_4$ |
|---|---|---|---|
| $F = F_0$ | .0375 | 1.88225 | .42738 |
| $F = \sqrt{F_0 F_m}$ | 1.31225 | 1.31225 | .075 |
| $F = F_m$ | 1.88225 | .0375 | .42738 |

Example III

| Radius | Thickness or Air Separation | Refractive Index $n_d$ | Abbé V Number | Clear Diameter |
|---|---|---|---|---|
| $R_1 = +1.9964$ | | | | 1.25 |
| | $D_1 = .0625$ | 1.7618 | 26.98 | |
| $R_2 = +1.0849$ | | | | |
| | $D_2 = .2125$ | 1.6177 | 49.78 | |
| $R_3 = -19.1161$ | | | | 1.205 |
| | $S_1 = $ variable | | | |
| $R_4 = +5.9363$ | | | | .578 |
| | $D_3 = .0375$ | 1.691 | 54.80 | |
| $R_5 = +.4401$ | | | | |
| | $D_4 = .075$ | 1.7174 | 29.51 | |
| $R_6 = +1.0484$ | | | | .522 |
| | $S_2 = .075$ | | | |
| $R_7 = -1.6614$ | | | | .514 |
| | $D_5 = .0375$ | 1.691 | 54.80 | |
| $R_8 = +10.1010$ | | | | .518 |
| | $S_3 = $ variable | | | |
| $R_9 = +1.1659$ | | | | .528 |
| | $D_6 = .0375$ | 1.7618 | 26.98 | |
| $R_{10} = +.71014$ | | | | |
| | $D_7 = .075$ | 1.5097 | 64.44 | |
| $R_{11} = \infty$ | | | | .522 |
| | $S_4 = $ variable | | | |
| $R_{12} = $ aspheric | | | | .522 |
| | $D_8 = .0625$ | 1.48503 | 70.29 | |
| $R_{13} = -3.8536$ | | | | .518 |
| | $S_5 = .05$ or $.7716$ | | | |
| $R_{14} = -1.2288$ | | | | .512 |
| | $D_9 = .0375$ | 1.65695 | 50.81 | |
| $R_{15} = +.4955$ | | | | |
| | $D_{10} = .075$ | 1.7618 | 26.98 | |
| $R_{16} = +1.1848$ | | | | .517 |
| | $S_6 = .7716$ or $.05$ | | | |
| $R_{17} = +2.1073$ | | | | .748 |
| | $D_{11} = .0425$ | 1.7618 | 26.98 | |
| $R_{18} = +.8350$ | | | | |
| | $D_{12} = .15$ | 1.61334 | 57.59 | |
| $R_{19} = -2.0653$ | | | | .751 |
| | $S_7 = .0025$ | | | |
| $R_{20} = +10.9880$ | | | | .749 |
| | $D_{13} = .0625$ | 1.5097 | 64.44 | |
| $R_{21} = -2.5082$ | | | | .747 |

The aspheric surface $R_{12}$ has radius of curvature $+1.8431F_0$ at the vertex and is defined by the equation:

$$x = (1.8431 - \sqrt{3.3970 - y^2}) - .01782y^4 + .2207y^6 + .8772y^8 - 1.8819y^{10}$$

The dimensions of the variable air spaces in the front assembly are as follows:

| | $S_1$ | $S_3$ | $S_4$ |
|---|---|---|---|
| $F = F_0$ | .0375 | 1.8264 | .41675 |
| $F = \sqrt{F_0 F_m}$ | 1.2736 | 1.2736 | .075 |
| $F = F_m$ | 1.8264 | .0375 | .41675 |

Example I includes a stationary rear assembly, comprising three member of which the front and rear members are convergent and the middle member divergent, and a front assembly incorporating the relatively movable members, and gives a range of variation of the equivalent focal length F of the objective from a minimum $F_0$ to a maximum $F_m$, which has the value $5F_0$.

Examples II and III differ from Example I in this respect in that they incorporate also the invention forming the subject of the copending United States Patent 3,081,-671 filed July 14, 1960, thereby providing two alternative ranges of variation of the equivalent focal length F of the objective, one extending from $F_0$ to $F_m$, which again has the value $5F_0$, and the other extending from $F_0^1$ to $F_m^1$, which have values respectively equal to $2F_0$ and $2F_m$. Thus, the rear assembly again comprises three members, of which the front and rear members are stationary and convergent and the middle member is divergent, but in this case the divergent middle member is axially adjustable between two preset positions, in which the middle member has the same conjugates but gives different magnifications.

The front assembly in Example I is identical with the front assembly in Example III.

In the foregoing tables, the linear dimensions are given in terms of $F_0$, the minimum value of F in the single range in Example I or in the lower range in Examples II and III.

The back focal distance (from the rear surface $R_{17}$ in Example I or $R_{21}$ in Examples II and III to the rear focal plane of the objective) is $1.7020F_0$ in Example I, $2.908F_0$ in Example II and $2.929F_0$ in Example III.

The iris diaphragm is located $.025F_0$ in front of the front surface $R_{12}$ of the rear assembly in all three examples, and has diameter $.522F_0$ in Example I, $.518F_0$ in Example II and $.522F_0$ in Example III.

The relative aperture of the objective is $f/4.0$ in Example I and for the lower range in Examples II and III, and $f/8.0$ for the higher range in such two examples.

The objective covers a semi-angular field varying from 11½ degrees at minimum equivalent focal length $F_0$ to 2½ degrees at maximum equivalent focal length $F_m$ in Example I and in the lower range in Examples II and III, and from 5¾ degrees at minimum focal length $F_0^1$ to 1¼ degrees at maximum focal length $F_m^1$ in the upper range in Examples II and III.

In all three examples the front assembly is substantially afocal throughout the range of movement and comprises three members, of which the front and rear members are convergent, whilst the middle member is divergent. As will be explained in greater detail later, the convergent front and rear members are mechanically interconnected to perform approximately equal and opposite movements under the control of a cam mechanism actuated by a zoom control element, while the divergent middle member is caused to perform an axial movement which bears an approximately linear relationship to the movement of the zoom control element, the shape of the cam and the interrelationship between the movements of the three members being such that the equivalent focal length of the objective varies in accordance with an approximately logarithmic law relatively to the movement of the zoom control element. In the following more detailed description of the movements, the equivalent focal lengths of the front, middle and rear members of the front assembly are designated $f_1$, $f_2$ and $f_3$ respectively.

During the change from minimum equivalent focal length $F_0$ to maximum equivalent focal length $F_m$ of the complete objective, the divergent middle member is driven by the zoom control element, for example through a screwthread drive, in linear relationship to the movement of that element in a rear-ward direction through a total travel equal to $$f_2(F_m - F_0)/\sqrt{F_0 F_m}$$

and at the same time the front and rear members are driven by the zoom control element through a single cam, so that they first move away from one another, each through a distance $$f_2(F_m + F_0 - 2\sqrt{F_0 F_m})/2\sqrt{F_0 F_m}$$

and then move back again towards one another to their starting positions. Thus, if $\Delta_1$, $\Delta_2$ and $\Delta_3$ respectively represent the distances moved by the three members at any moment from their starting positions, these movements are defined by the equations:

$$\Delta_2 = Xf_2(F_m - F_0)/\sqrt{F_0 F_m}$$

$$\Delta_1 = \Delta_3 = f_2[X(F_m - F_0) - (F - F_0)]/\sqrt{F_0 F_m}$$

$$2F = (2X-1)(F_m - F_0) + \sqrt{(2X-1)^2(F_m - F_0)^2 + 4F_0 F_m}$$

where X varies from 0 to 1 in linear relationship to the movement of the zoom control element.

The rate of change of F defined by the above expression does not vary exactly logarithmically with respect to X, but the relationship is sufficiently nearly logarithmic to serve the required purpose.

Since the movements of the front and rear members are equal and opposite, they can be arranged to act as counterweights for each other and will therefore exert balanced forces when the objective axis is tilted away from the usual horizontal position. Since further their maximum movement is small, only about $.38F_o$ in Examples I and III and $.39F_o$ in Example II, they do not require steep slopes in the cam throughout the movement.

The final image plane of the objective remains constant throughout the movements, and the size of the image increases as the equivalent focal length increases, so that the ratio of maximum image size to minimum image size is $F_m/F_o$ in the single range of Example I or in each of the ranges in Examples II and III, since $F_m^1/F_o^1$ is equal to $F_m/F_o$.

In the foregoing description of the movements, it has been assumed that the object position remains constant, for example at infinity. Focussing for near object positions can be effected by means of an additional forward movement of the front member of the front assembly. If $d$ is the distance of the object from the front nodal plane of the front member in its position of adjustment, the necessary further adjustment of the front member for focussing purposes consists of a forward movement through a distance equal to $f_1^2/(d-f_1)$. This additional focussing movement may be effected, under the control of a focussing control element, independently of the zooming movement, for example mounting the front member adjustably in its mount.

The equivalent focal lengths $f_1$, $f_2$ and $f_3$ of the front, middle and rear members of the front assembly are respectively $+3.553F_o$, $-1.000F_o$ and $+3.829F_o$ in Examples I and III, and $+3.704F_o$, $-1.031F_o$ and $+3.405F_o$ in Example II.

The equivalent focal length $f_2$ of the divergent middle member of the front assembly multiplied by the $f$/number of the objective preferably lies between 1 and 2.67 times the negative value of $\sqrt{F_oF_m}$ (an equivalent focal length being reckoned as positive if convergent and negative if divergent). Since, in the examples, $F_m=5F_o$, the expression $\sqrt{F_oF_m}$ is equal to $2.236F_o$, and the product of $f_2$ and the $f$ number of the objective divided by the negative value of $\sqrt{F_oF_m}$ is 1.79 in Examples I and III and 1.84 in Example II.

The equivalent focal lengths $f_1$ and $f_3$ of the front and rear members of the front assembly preferably each lie between 0.9 and 1.33 times the expression $$-f_2(1+\sqrt{F_m/F_o})$$

Such expression has the value $3.236F_o$, so that the ratios of $f_1$ and $f_3$ to such expression are respectively 1.10 and 1.02 in Example I and in Example III and respectively 1.11 and 1.02 in Example II.

The equivalent focal length $F_R$ of the rear assembly preferably lies between 0.8 and 1.1 times the geometric mean of the minimum and maximum values of the equivalent focal length of the objective in the range of variation, that is $\sqrt{F_oF_m}$ in the single range of Example I and in the lower range of Examples II and III, or $\sqrt{F_o^1F_m^1}$ in the upper range of Examples II and III. In Example I, $F_R$ is $2.075F_o$ that is 0.93 times $\sqrt{F_oF_m}$. In Example II, $F_R$ has the value $2.055F_o$ in the lower range or 0.93 times $\sqrt{F_oF_m}$, and the value $4.110F_o$ in the upper range or 0.93 times $\sqrt{F_o^1F_m^1}$. In Example III, in the lower range $F_R$ is $2.074F_o$ or 0.93 times $\sqrt{F_oF_m}$, and in the upper range $F_R$ is $4.148F_o$ or 0.93 times $\sqrt{F_o^1F_m^1}$.

It has already been explained that the arrangement according to the invention, with the movements of the members above described, is highly advantageous in facilitating mechanical control of the movements, but it also has important advantages for the correction of the aberrations. Thus, it makes it possible, in a manner to be described below, to achieve a high degree of aberration correction throughout the range of movement with a relatively simple construction of the individual members of the two assemblies, but it is also possible in a variety of ways with even simpler construction of such members to achieve a somewhat lower standard of performance which is however adequate for many practical purposes. In a preferred arrangement, giving a high standard of performance, the optical characteristics of the front two members of the front assembly are such that their total aberration contributions have approximately the same values at the beginning and end of the range of movement, whilst those of the rear member of the front assembly serve approximately to compensate for variations from such values at intermediate positions in the range, the rear assembly having the form of a modification of a self-corrected optical system to afford compensation for the approximately stabilised residual aberrations of the front assembly. Certain features in the members of the front assembly are advantageous for aberration correction, whether this preferred arrangement is adopted or not.

In this connection, it is highly advantageous to make use of a further important feature of the invention. It has been mentioned above that in various known objectives of the zoom type the relatively movable members include a movable divergent member which is located in front of the diaphragm and behind at least one other member and receives from the member in front of it a converging beam, and that it is customary to provide such member with a strongly collective internal contact in order to facilitate spherical aberration correction. The further feature of the present invention departs from such known arrangement in order to make use of such divergent member to assist in correction not only for spherical aberration, but also for astigmatism (which is usually poorly corrected in such prior known arrangements) and for the other primary aberrations. According to this further feature, the said movable divergent member comprises a divergent doublet component in front of a divergent simple component, and the axial travel of the divergent member during the range of relative movement exceeds the equivalent focal length $f_2$ of the divergent member, the internal contact in such doublet component being strongly convex towards the front with radius of curvature lying numerically between $0.3f_2$ and $0.6f_2$, whilst the difference between the mean refractive indices of the materials of the two elements of the said doublet component is less than 0.04. Thus, the internal contact in the doublet component is dispersive or only relatively slightly collective. This facilitates astigmatism correction, whilst still permitting the desired spherical aberration correction. The said movable divergent member is constituted in the examples by the divergent middle member of the front assembly. Thus, the radius of curvature $R_5$ is numerically equal to $0.44f_2$ in Examples I and III and to $0.37f_2$ in Example II, and the axial travel of the divergent middle member is numerically equal to $1.79f_2$ in all three examples, whilst the difference between the mean refractive indices of the materials of the two elements of the doublet component is .026 in Examples I and III and 0.17 in Example II.

Further assistance towards correction of spherical aberration and astigmatism, as well as assistance to the correction of coma, may be afforded by making the radii of curvature of the two surfaces of the simple divergent component of the said movable divergent member each numerically greater than the equivalent focal length $f_2$ of such divergent member, and preferably also by making the rear surface of the doublet component of such member convex to the front with radius of curvature numerically greater than $0.66f_2$ and less than the total travel of the divergent member. For assisting towards correction of axial and oblique chromatic aberration, the Abbé V number of the material of the front element of the doublet component of such divergent member conveniently exceeds that of the material of the rear element thereof by between 15 and 30. In the examples, the radii $R_7$ and $R_8$ of the simple component are numerically equal respectively to $1.66f_2$ and $10.10f_2$ in Examples I and III and to $1.87f_2$ and $6.06f_2$ in Example II. The radius $R_6$ of the rear surface of the doublet component is numerically equal to $1.05f_2$ in Examples I and III and $.97f_2$ in Example II, and the difference between the Abbé V numbers of the materials of the two elements of such doublet component is 25.3 in Examples I and III and 22.8 in Example II.

It should be noted that the internal contact in such doublet component is dispersive in Example II. This feature in conjunction with the arrangement of the front member is highly advantageous for astigmatism correction and Example II affords a high standard of correction, so long as the object distance is large. However, the aberration correction in such example becomes slightly unbalanced in the case of small object distances and this example should in practice be restricted in its application so far as object distances are concerned, if particularly high standards of correction are required.

In Examples I and III the internal contact in the divergent middle member is slightly collective and, although this (in conjunction with the arrangement of the front member) is somewhat less advantageous for astigmatism correction, it enables the desired high standard of correction to be maintained for short object distances as well as for large object distances.

The convergent front member of the front assembly also contributes towards stabilisation of the aberrations. Thus, for assisting in stabilisation of axial and oblique chromatic aberration, such front member preferably includes a doublet component having a convergent element and a divergent element, the mean refractive index of the material of the divergent element exceeding that of the material of the convergent element by between .08 and .20, whilst the Abbé V number of the material of the convergent element exceeds that of the material of the divergent element by between 20 and 30.

For contributing towards the stabilisation of spherical aberration, astigmatism and coma, the front surface of the doublet component of the front member is preferably convex to the front with radius of curvature between $.5f_1$ and $f_1$, whilst the radius of curvature of the rear surface of such component exceeds $3f_1$, where $f_1$ is the equivalent focal length of such front member.

In the examples, such front member consists of a convergent doublet having a convergent element and a divergent element with a dispersive internal contact between them. In Examples I and III the divergent element is in front of the convergent element, whilst in Example II the convergent element is in front of the divergent element. The mean refractive index of the material of the divergent element exceeds that of the material of the convergent element by .144 in Examples I and III and .105 in Example II. The difference between the Abbé V numbers of these two materials is 22.8 in Examples I and III and 23.8 in Example II. The radius of curvature $R_1$ of the front surface of such component is $.56f_1$ in Examples I and III and $.62f_1$ in Example II, and the radius $R_3$ of the rear surface of such component is $5.38f_1$ in Examples I and III and $6.88f_1$ in Example II.

When the preferred method of correction is employed, it becomes possible, with the aid of the foregoing features of the front two members of the front assembly, to stabilise the main aberrations at the two ends of the range, leaving some incomplete stabilisation at intermediate positions in the range, which can be dealt with by suitable arrangement of the rear member of the front assembly.

Thus, there may be some residual over-correction of astigmatism by the characteristics of the front two members in intermediate positions, which can be compensated by arranging the rear member to suffer under-correction of astigmatism as it moves away from its starting position towards the rear. For this purpose, the radius of curvature of the rear surface of such rear member conveniently exceeds $3f_3$, whilst that of the front surface of such member lies between $.25f_3$ and $.65f_3$, where $f_3$ is the equivalent focal length of such convergent rear member.

This convergent rear member preferably includes a doublet component having a dispersive internal contact which is convex to the front with radius of curvature between $.15f_3$ and $.35f_3$. This, in conjunction with suitable choice of the refractive indices of the materials in this component, may be used for approximate stabilisation of coma at the intermediate positions. For this purpose the mean refractive index of the material of the front element of the doublet component may conveniently exceed that of the material of the rear element thereof by between .15 and .35.

As regards correction of chromatic aberrations, although it would be possible to provide good correction of axial chromatic aberration in the front assembly, it will sometimes be preferred to sacrifice this to some extent in order to achieve better stabilisation of oblique chromatic aberration. Thus, by some degree of over-correction of axial chromatic aberration in the rear member, it is possible to provide some outward oblique aberration correction at intermediate positions to compensate for some residual inward oblique aberration in the front two members at such positions. For this purpose, in conjunction with the above-mentioned radius limitations for the internal contact, the Abbé V number of the material of the rear element of the doublet in the rear member preferably exceeds that of the material of the front element by between 25 and 45.

Thus, in the examples, the rear member of the front assembly consists of a doublet component with a dispersive internal contact, whose radius of curvature $R_{10}$ is $.22f_3$ in Examples I and III and $.21f_3$ in Example II. The difference between the mean refractive indices of the materials of the two elements of such doublet component is .252 and the difference between the Abbé V numbers of such materials is 37.5, in all three examples. The radius of curvature of the front surface $R_9$ of such doublet component is $.30f_3$ in Examples I and III and $.35f_3$ in Example II. The rear surface of such doublet component has infinite radius of curvature in all three examples.

By arranging the front assembly in the manner above described, it becomes possible approximately to stabilize all the main aberrations in the front assembly throughout the range of movement, leaving only relatively small residual stabilised aberrations, more particularly axial and chromatic aberrations. These residual aberrations can readily be compensated by relatively minor modifications to an otherwise self-corrected rear assembly, and it will be clear therefore that there is a relatively wide choice available as to the type of optical system used for the rear assembly. In general, almost any of the well-known types of corrected objective used, for example, for photography, can be utilised, with the appropriate minor modifications, for the rear assembly.

Thus, in one simple arrangement the rear assembly has the form of the well-known type of objective comprising three simple components, of which the front and rear components are convergent and the middle component is divergent, and in such case a high degree of correction for higher order spherical aberration throughout the range of focal length variation can be obtained by making the front surface of the rear assembly aspheric, minor modifications being made elsewhere in the rear assembly for compensating for the other residual stabilised aberrations of the front assembly. Such an arrangement is employed in all three examples, the three members in Example I all being simple components, whilst in Examples II and III slightly more complex members are used in order to enable good correction to be achieved in the two different positions of the middle member to give the two ranges of variation of equivalent focal length.

Thus, in the rear assembly in Examples II and III, the stationary front member consists of a divergent doublet component, and the stationary rear member consists of a convergent doublet component followed by a convergent simple component. In one of its two preset positions the middle member is close to the rear member, and in the other it is close to the front member. In these two positions the magnifications due to the middle member are respectively $\sqrt{M}$ and $1/\sqrt{M}$, where M is the ratio between the equivalent focal lengths of the objective in the two ranges, and since in both examples M is 2, these magnifications are respectively 1.414 and .707. The middle member has the same conjugates in the two positions, the front conjugate in one position being equal to the back conjugate in the other position. Thus, the two conjugate distances are $f_5(1+\sqrt{M})$ and $$f_5(1+\sqrt{M})/\sqrt{M}$$

that is $2.414f_5$ and $1.707f_5$, which are equal in Example II to $2.441F_0$ and $1.726F_0$, and in Example III to $2.462F_0$ and $1.741F_0$. The distance between the two preset positions is equal to the difference between the two conjugate distances and is $0.715F_0$ in Example II and $0.721F_0$ in Example III. In this way, as has already been mentioned, it becomes possible to get two ranges of variation of the equivalent focal length of the objective, with the same image plane, the transfer from one range to the other being effected in a simple manner by moving the middle member of the rear assembly from one operative position to the other. In both examples, the rear assembly is a modified form of a self-corrected optical system, the modifications serving to compensate for stabilised residual aberrations of the front assembly, as in Example I, such compensation being effective in both operative positions of the middle member.

The equivalent focal lengths $f_4$, $f_5$ and $f_6$ respectively of the front, middle and rear members of the rear assembly are $+2.557F_0$, $-1.011F_0$ and $+1.399F_0$ in Example II, and $+2.580F_0$, $-1.020F_0$ and $+1.403F_0$ in Example III.

The mechanism for actuating the objective can be arranged in a variety of ways, but one form of construction of such mechanism is illustrated diagrammatically by way of example in FIGURE 4. In this construction, the front, middle and rear members of the front assembly are indicated respectively at A, B and C and the rear assembly is indicated at E, with an actuating ring $E^1$ for the diaphragm and a second actuating ring $E^2$ for moving the middle member of the rear assembly from one of its two preset positions to the other to alter the range of variation of equivalent focal length from the lower range to the upper range and vice versa. The three members of the front assembly are shown in the positions they occupy at the minimum end of the range.

The divergent middle member B of the front assembly is driven by means of a nut $F^1$ held against rotation on a screw-thread F which is driven through gear wheels $F^2$ $F^3$ by the zoom control element indicated at G, so that the rate of movement of such middle member B bears a linear relationship to the rate of movement of the zoom control element.

The zoom control element G also acts through gear wheels $H^1$ $H^2$ to drive a hollow drum H having a cam groove $H^3$. A roller $J^1$ engaging in this cam groove $H^3$ is carried by a rack J, which directly operates the rear member C of the front assembly. A second rack K for operating the front member A of the front assembly is driven by the first rack J through a pinion $K^1$, so that the two racks, and therefore also the two members A and C, perform equal and opposite movements.

The shape of the cam groove $H^3$ is such that, while the divergent middle member B is moving from one end to the other of its range of movement, the rear member C and the front member A first move outwardly away from each other and then move inwardly again back to their original starting positions. In the arrangement illustrated, the drum H performs one complete revolution in its movement from one end to the other of the range, the outward and return movements of each of the members A and C being similar to one another. The cam groove is so shaped, in relationship to the screwthread F, that the equivalent focal length of the objective varies in accordance with an approximately logarithmic law relatively to the movement of the zoom control element G, so that the size of the resultant image changes at a rate bearing an approximately linear relationship to the movement of the zoom control element. It is particularly to be noted that the total movements of the members A and C are relatively small, so that the cam slope is not steep.

Focussing for short object distances is effected, under the control of a focussing control element L, by superimposing an additional forward movement to the front member A of the front assembly. For this purpose, the focussing control element L drives a screwthread M and a nut $M^1$ held against rotation as such thread moves the pinion $K^1$ at a rate half that of the desired focussing movement of the front member A. Owing to the irreversibility of the screwthread drive, the screwthread M acts as an abutment to prevent translational movement of the pinion $K^1$ during zooming movements, except when the focussing control element L is being operated, and likewise the engagement of the roller $J^1$ in the cam groove $H^3$ (owing to the fact that the cam slope is not steep) acts as an abutment to prevent movement of the rear member C of the front assembly during focussing control movements, except when the zoom control element G is being operated. The zooming and focussing movements can, however, be performed simultaneously, if desired.

The rack J is weighted so that the total weight of such rack and the member C is approximately equal to that of the rack K and the member A, so that the two oppositely moving units will act as counterweights for each other whenever the optical axis of the objective is tilted away from its usual horizontal position, as will happen when it is desired to photograph objects in an inclined direction. There will thus be no tendency for these members A and C, which in practice will be relatively heavy, themselves to drive the mechanism when the objective is tilted. The member B is also prevented from exerting such a tendency, owing to the irreversibility of the screwthread drive, the gear ratios of the gear wheels $F^2$ $F^3$ and $H^1$ $H^2$ and the relative diameters of the drum H and the screwthread F being so chosen as to avoid the necessity for too quick a pitch for the screwthread F.

It will be clear that various other forms of actuating mechanism can be utilised, if desired, instead of that above described with reference to FIGURE 4.

It will also be appreciated that the three examples, of which numerical data have been given above, indicate some only of many ways in which the invention can be carried into effect. For example, as has already been mentioned, a wide variety of different types of rear assembly can be employed in place of those described. Again, it is by no means essential to the invention to employ an aspheric surface in the rear assembly and similar results as regards aberration correction can readily be obtained, without such aspheric surface, with a more complex structure for the rear assembly.

What I claim as my invention and desire to secure by Letters Patent is:

1. An optical objective of variable focal length of the zoom type having members relatively movable for effecting variation of the equivalent focal length of the objective whilst maintaining constant position of the final image plane, including in combination a normally stationary rear lens assembly, a front lens assembly which is substantially afocal throughout the range of relative movement and comprises three members constituting the relatively movable members for effecting the focal length variation the front and rear members being convergent and the middle member divergent, a zoom control element, transmission means comprising a cam and actuated by the zoom control element, said transmission means in turn actuating the convergent front and rear members of the front assembly and causing said members to perform equal and opposite axial movements dependent upon the cam shape, transmission means interposed between the zoom control element and the divergent middle member of the front assembly whereby such member is caused by the zoom control element to perform an axial movement bearing an approximately linear relationship to the movement of the zoom control element, the shape of the cam being such that the inter-related movements of the middle member and of the front and rear members cause the equivalent focal length of the objective to vary in accordance with an approximately logarithmic law relatively to the movement of the zoom control element.

2. An optical objective of the zoom type as claimed in claim 1, in which the equivalent focal length of the divergent middle member of the front assembly multiplied by the $f$/number of the complete objective lies between 1 and 2.67 times the negative value of $\sqrt{F_0 F_m}$, where $F_0$ and $F_m$ are respectively the minimum and maximum values of the equivalent focal length of the complete objective in the range of variation (an equivalent focal length being reckoned as positive if convergent and as negative if divergent).

3. An optical objective of the zoom type as claimed in claim 2, in which the equivalent focal length of each of the two convergent members of the front assembly bears to that of the divergent middle member thereof a ratio lying numerically between 0.9 and 1.33 times the expression $1+\sqrt{F_m/F_0}$.

4. An optical objective of the zoom type as claimed in claim 3, in which the rear asembly is convergent and its equivalent focal length lies between $0.8\sqrt{F_0 F_m}$ and $1.1\sqrt{F_0 F_m}$.

5. An optical objective of the zoom type as claimed in claim 4, in which the front and rear members of the front assembly first move away from one another from their starting positions and then return again to their starting positions at the end of the range of movement, while the middle member moves steadily in one direction between a forward end position corresponding to the minimum value of the equivalent focal length of the objective and a rear end position corresponding to the maximum value thereof, the total aberration contributions of the front two members having approximately the same values at the beginning and at the end of the range of movement, while those of the rear member of the front assembly serve approximately to compensate for variations from such values at intermediate positions in the range, thus approximately stabilising the residual aberrations of the front assembly throughout the range, the rear assembly affording compensation for such stabilised residual aberrations.

6. An optical objective of the zoom type as claimed in claim 2, in which the convergent front and rear members of the front assembly first move away from one another from their starting positions and then return again to such positions at the end of the range of movement, while the divergent middle member moves steadily in one direction between a forward end position corresponding to the minimum value of the equivalent focal length of the objective and a rear end position corresponding to the maximum value thereof.

7. An optical objective of the zoom type as claimed in claim 2, including a focussing control element, and means whereby actuation of such focussing control element causes a further axial movement to be imparted to the front member of the front assembly to enable the objective to be focussed on different object positions without alteration of the position of the final image plane of the objective.

8. An optical objective of the zoom type as claimed in claim 1, including a focussing control element, and means whereby actuation of such focussing control element causes a further axial movement to be imparted to the front member of the front assembly to enable the objective to be focussed on different object positions without alteration of the position of the final image plane of the objective.

9. An optical objective of variable focal length of the zoom type having members relatively movable for effecting variation of the equivalent focal length of the objective whilst maintaining constant position of the final image plane, including in combination a normally stationary rear lens assembly, a front lens assembly which is substantially afocal throughout the range of relative movement and comprises three movable members of which the front and rear members are convergent and the middle member is divergent, such three members constituting the relatively movable members for effecting the focal length variation, a zoom control element, transmission means comprising a cam and actuated by the zoom control element, said transmission means in turn actuating the convergent front and rear members of the front assembly and causing said members to perform equal and opposite axial movements dependent on the cam shape first away from one another from their starting positions at the end of the range of movement, and transmission means interposed between the zoom control element and the divergent middle member of the front assembly whereby such member is caused by the zoom control element to perform a steady axial movement in one direction between two end positions at a rate bearing a linear relationship to that of the movement of the zoom control element, one of such end positions being a forward end position corresponding to the minimum value of the equivalent focal length of the objective and the other a rear end position corresponding to the maximum value of such focal length, the shape of the cam being such that the inter-related movements of the three members of the front assembly cause the equivalent focal length of the objective to vary in accordance with an approximately logarithmic law relatively to the movement of the zoom control element.

10. An optical objective of the zoom type as claimed in claim 9, in which the total aberration contributions of the front two members of the front assembly have approximately the same values at the beginning and at the end of the range of movement, and those of the rear member of the front assembly serve approximately to compensate for variations from such end values at intermediate positions in the range, whereby the residual aberrations of the front assembly are approximately stabilised throughout the range, the rear assembly serving to afford compensation for such stabilised residual aberrations.

11. An optical objective of the zoom type as claimed in claim 10, in which the divergent middle member of the front assembly includes a divergent doublet component having an internal contact which is strongly convex to the front with radius of curvature lying between 0.3 and 0.6 times the numerical value of the equivalent focal length of such divergent middle member, the difference between the mean refractive indices of the materials of the two elements of such divergent doublet component being less than 0.04.

12. An optical objective of the zoom type as claimed in claim 11, in which the divergent middle member of the front assembly includes a simple divergent component located behind the said divergent doublet component, the radii of curvature of the two surfaces of such simple component each being numerically greater than the equivalent focal length of the divergent middle member, the total axial travel of such divergent middle member during the range of relative movement being greater than the equivalent focal length of such member.

13. An optical objective of the zoom type as claimed in claim 12, in which the rear surface of the divergent doublet component of the said divergent middle member is convex to the front with radius of curvature numerically greater than 0.66 times the equivalent focal length of such divergent middle member and less than the total travel of such member, and the Abbé V number of the material of the front element of such divergent doublet component exceeds that of the material of the rear element thereof by between 15 and 30.

14. An optical objective of the zoom type as claimed in claim 10, in which the convergent front member of the front assembly includes a doublet component having a convergent element and a divergent element, the mean refractive index of the material of the divergent element exceeding that of the convergent element by between .08 and .20 and the Abbé V number of the material of the convergent element exceeding that of the divergent element by between 20 and 30, the front surface of such doublet component being convex to the front with radius of curvature between .5 and 1.0 times the equivalent focal length of such convergent front member, and the radius of curvature of the rear surface of the doublet component exceeding 3 times such focal length.

15. An optical objective of the zoom type as claimed in claim 10, in which the convergent rear member of the front assembly includes a doublet component having a dispersive internal contact which is convex to the front with radius of curvature between .15 and .35 times the equivalent focal length of such convergent rear member, the material of the front element of such doublet component having means refractive index exceeding that of the material of the rear element thereof by between .15 and .35 and having Abbé V number less than that of the material of the rear element by between 25 and 45.

16. An optical objective of the zoom type as claimed in claim 9, in which the divergent middle member of the front assembly comprises a divergent doublet component having an internal contact strongly convex to the front and a simple divergent component located behind such doublet component, the total axial travel of the divergent middle member during the range of movement being greater than the equivalent focal length of such member.

17. An optical objective of the zoom type as claimed in claim 16, in which the convergent front member of the front assembly includes a doublet component having a divergent element and a convergent element, the material of such divergent element having mean refractive index exceeding that of the convergent element by between .08 and .20 and Abbé V number less than that of the convergent element by between 20 and 30, and the convergent rear member of the front assembly includes a doublet component having a dispersive internal contact which is convex to the front with radius of curvature between .15 and .35 times the equivalent focal length of such convergent rear member.

18. An optical objective of the zoom type as claimed in claim 9, including a focussing control element, and means whereby actuation of such focussing control element causes a further axial movement to be imparted to the front member of the front assembly to enable the objective to be focussed on different object positions without alteration of the position of the final image plane of the objective.

19. An optical objective of variable focal length of the zoom type having members relatively movable for effecting variation of the equivalent focal length of the objective while maintaining constant position of the final image plane, including in combination a normally stationary rear lens assembly, a front lens assembly comprising three relatively movable members of which the front and rear members are convergent and the middle member is divergent, a zoom control element, transmission means actuated by the zoom control element and causing the convergent front and rear members to perform approximately equal and opposite axial movements under the control of the zoom control element, and transmission means interposed between the zoom control element and the divergent middle member whereby such middle member is caused by the zoom control element to perform an axial movement the total length of which is greater than the equivalent focal length of such divergent member, such divergent member comprising a divergent doublet component and a simple divergent component located behind the doublet component and including an internal contact strongly convex to the front with radius of curvature lying between 0.3 and 0.6 times the equivalent focal length of the said divergent member, the difference between the mean refractive indices of the materials of the said doublet component being less than 0.4.

20. An optical objective of the zoom type as claimed in claim 19, in which the rear surface of the divergent doublet component of the said movable divergent member is convex to the front with radius of curvature numerically greater than 0.66 times the equivalent focal length of such divergent member and less than the total travel of such member.

21. An optical objective of the zoom type as claimed in claim 20, in which the radii of curvature of the two surfaces of the simple divergent component of the said movable divergent member are each numerically greater than the equivalent focal length of such divergent member, and the Abbé V number of the material of the front element of the divergent doublet component of such divergent member exceeds that of the rear element of such component by between 15 and 30.

22. An optical objective of the zoom type as claimed in claim 19, in which the radii of curvature of the two surfaces of the simple divergent component of the said movable divergent member are each numerically greater than the equivalent focal length of such divergent member.

References Cited by the Examiner
UNITED STATES PATENTS

| | | | |
|---|---|---|---|
| 2,165,341 | 7/39 | Capstaff et al. | 88—57 |
| 2,847,907 | 8/58 | Angenieux | 88—57 |
| 2,913,957 | 11/59 | Back | 88—57 |

FOREIGN PATENTS 1,086,062   7/60   Germany.

JEWELL H. PEDERSEN, *Primary Examiner.*

EMIL G. ANDERSON, *Examiner.*